Sept. 5, 1950  J. V. KELLY  2,521,227
PHONOGRAPH RECORD DISPENSER
Filed Dec. 6, 1945  5 Sheets-Sheet 1

INVENTOR.
Jerome V. Kelly.
BY
Harness, Dickey & Pierce.
ATTORNEYS.

Sept. 5, 1950  J. V. KELLY  2,521,227
PHONOGRAPH RECORD DISPENSER
Filed Dec. 6, 1945  5 Sheets-Sheet 3

INVENTOR.
Jerome V. Kelly.
BY
Harness, Dickey & Pierce.
ATTORNEYS.

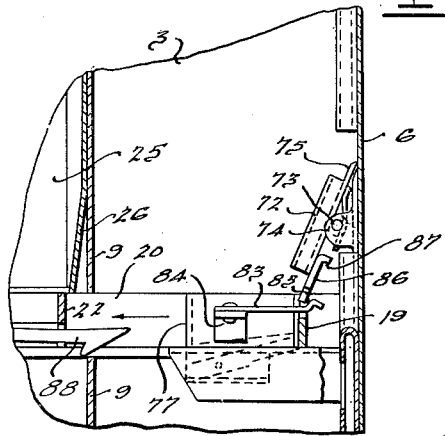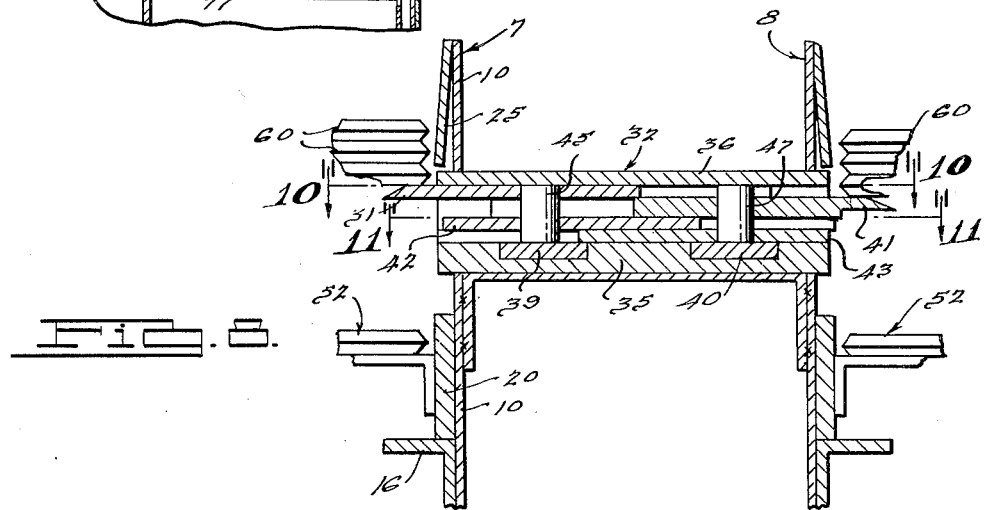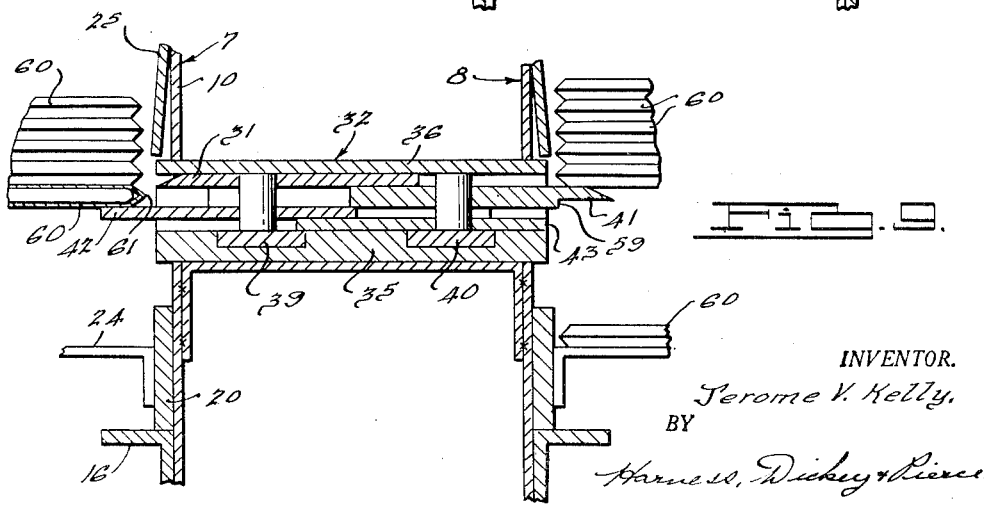

Sept. 5, 1950 J. V. KELLY 2,521,227
PHONOGRAPH RECORD DISPENSER
Filed Dec. 6, 1945 5 Sheets-Sheet 5
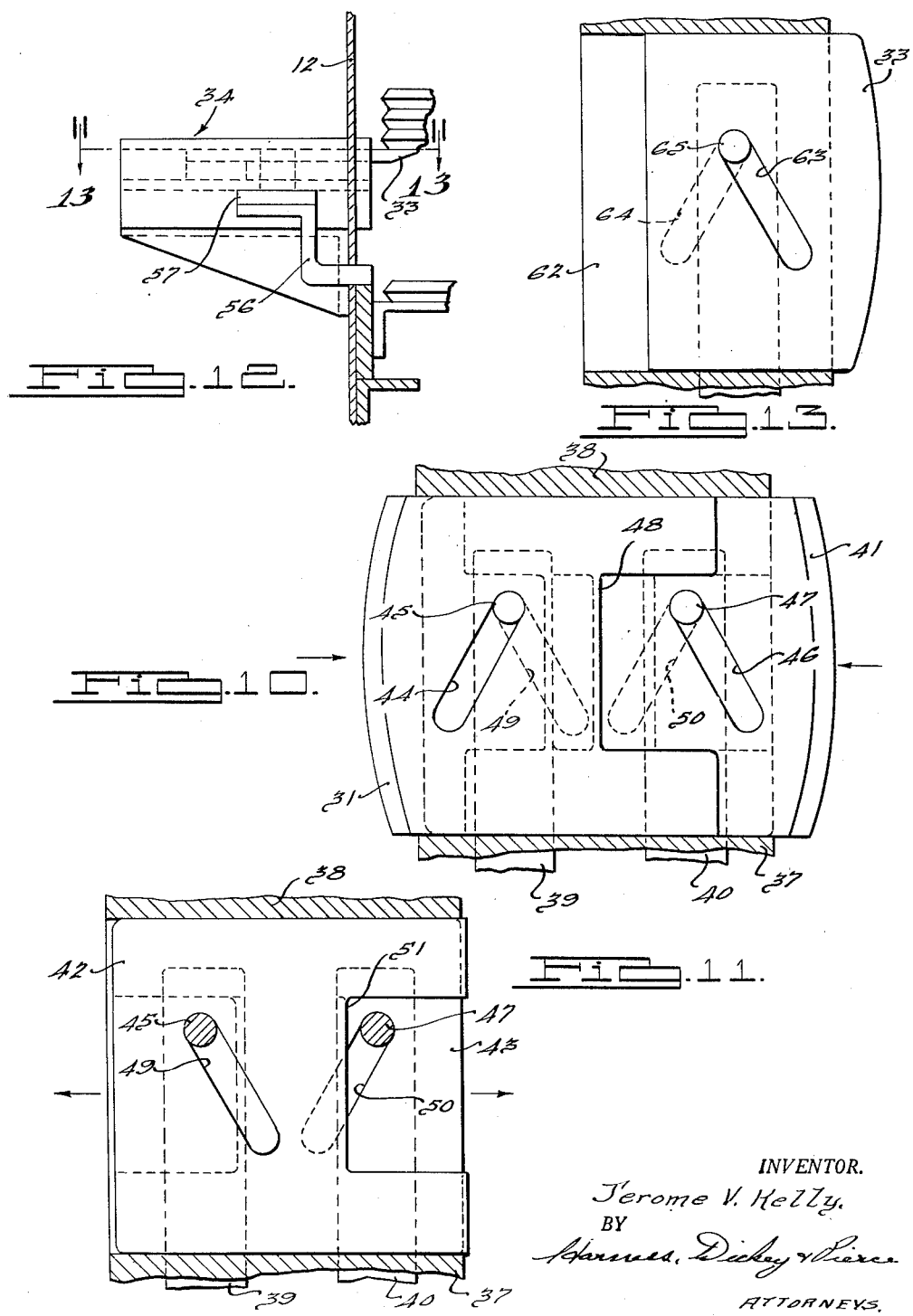
INVENTOR.
Jerome V. Kelly.
BY
ATTORNEYS.

Patented Sept. 5, 1950

2,521,227

UNITED STATES PATENT OFFICE 2,521,227

PHONOGRAPH RECORD DISPENSER

Jerome V. Kelly, Detroit, Mich.

Application December 6, 1945, Serial No. 633,156

12 Claims. (Cl. 194—2)

The present invention relates to a coin controlled phonograph record vending machine.

The general object of the present invention is to provide a machine of the type mentioned which is characterized by its simple and rugged construction and low cost of manufacture.

Another object of the invention is to provide a vending machine capable of vending any one of a plurality of different disk records.

Another object is to provide a machine having a maximum possible storage capacity for a minimum size.

Another object is to provide a machine which is easy to load and service.

Another object is to provide an improved means for selecting the record which is to be discharged by the machine.

A further object is to provide improved means for controlling the feed of records from a storage reservoir to the discharge mechanism.

Other objects and advantages of the invention will become apparent from the following specification, the accompanying drawings and the appended claims.

In the drawings:

Figure 4 is a fragmentary section taken on the line 4—4 of Figure 3 showing one of the coin deflecting mechanisms in the position it assumes when the corresponding record has been selected for discharge;

Figure 7 is a fragmentary view taken on the line 7—7 of Figure 2 showing the means for retaining the removable front cover of one of the record reservoirs;

Figure 8 is a section taken on the line 8—8 of Figure 3 showing the mechanism for discharging one record at a time from the record reservoir;

Figure 9 is a section similar to that of Figure 8 showing the parts in a different position;

Figure 10 is a fragmentary section taken on the line 10—10 of Figure 8;

Figure 11 is a fragmentary section taken on the line 11—11 of Figure 8;

Figure 12 is a front elevation of the record discharging mechanism employed at one side of the reservoir taken on the line 12—12 of Figure 3;

Figure 13 is a fragmentary section taken on the line 13—13 of Figure 12; and

Figure 1:
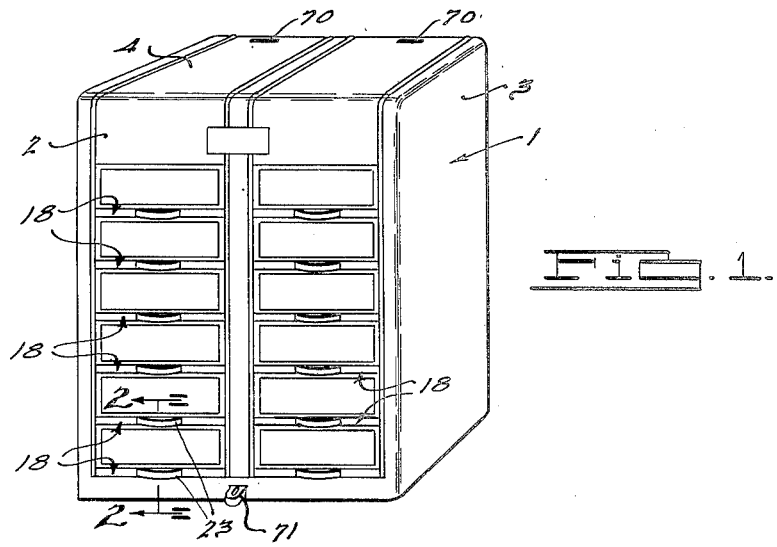
Figure 1 is a perspective view of the exterior casing of the machine.
Figure 2:
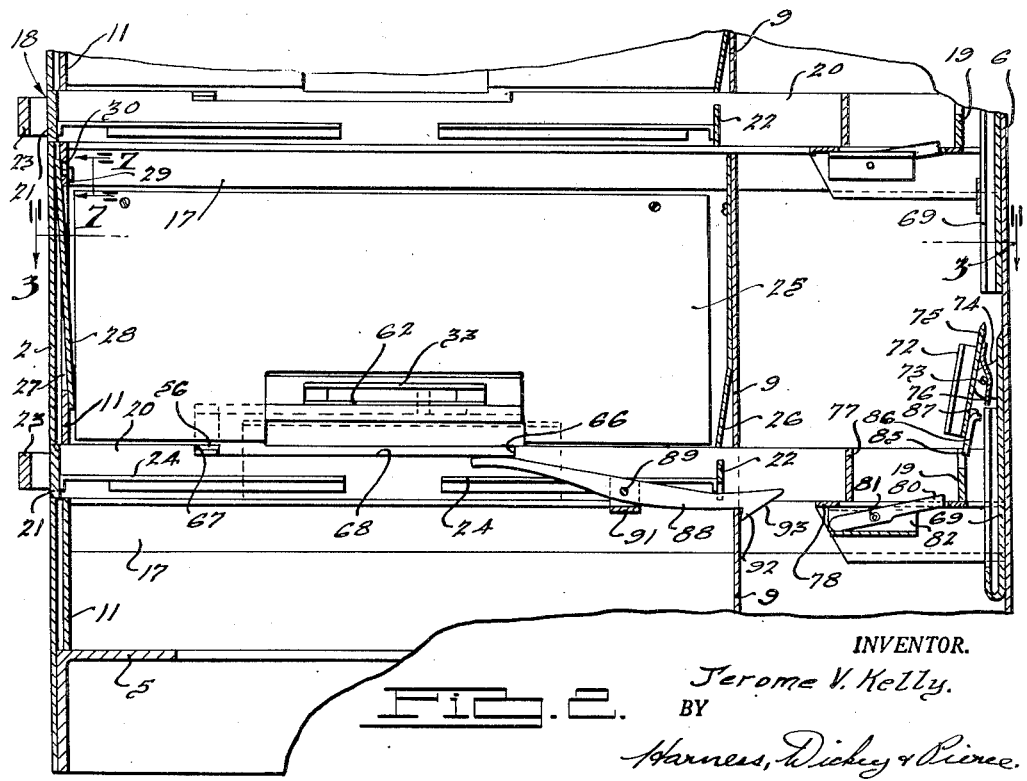
Figure 2 is a fragmentary section taken on the line 2—2 of Figure 1.
Figure 3:
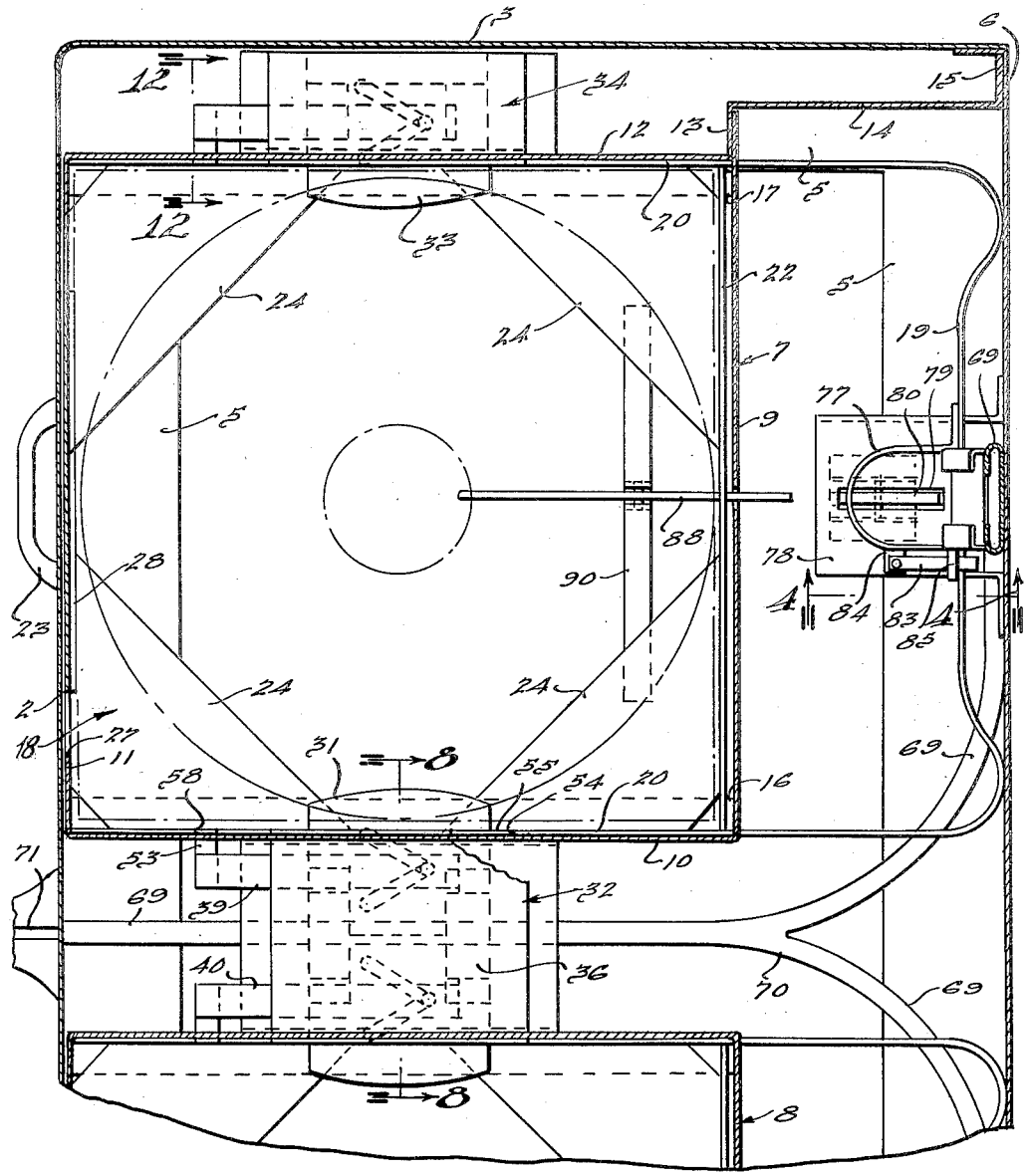
Figure 3 is a fragmentary horizontal section taken on the line 3—3 of Figure 2.

Referring particularly to Figures 1, 2 and 3, the machine includes a removable casing indicated generally at 1 and made up of a front wall 2, a pair of side walls 3, and the top 4. The back and bottom of the casing are open. The casing is a unitary structure removable as a whole from the remainder of the machine. The main chassis of the machine includes a base 5 of angle iron construction, as best shown in Figures 2 and 3, which extends entirely around the periphery of the machine at the bottom thereof. The main frame of the machine, which rests upon the angle irons 5 and is fixed thereto, comprises a back wall 6 and a pair of vertically extending sheet metal casings indicated generally at 7 and 8, which are generally square in cross section and extend vertically the full height of the interior of the casing 1.

The casing 7 is formed from a single sheet of metal bent into the form shown best in Figure 3 to provide a rear wall 9, an inner side wall 10, a front wall 11 and an outer side wall 12. The rear wall 9 and the outer side wall 12 are fixed together by spot welding at flange 13 of the wall 12, and the flange 13 is bent rearwardly at 14 and thence outwardly at 15 where it is spot welded to the back wall 6. The construction and arrangement of the casing 8 is identical to that of the casing 7 except that it is oppositely disposed and spaced laterally with respect to the casing 7.

The walls 10 and 12 of the casing 7 are provided with a plurality of vertically spaced horizontally extending and inwardly projecting angle irons 16 and 17 respectively, which support six vertically spaced horizontally sliding drawers, indicated generally at 18 and best shown in Figures 2 and 3. Each of the drawers is formed by a single continuous strip of metal bent to form a rear wall 19, side walls 20, and front wall 21. Each of the drawers also includes a transverse strip 22, which extends across between the side walls 20. The front wall of the housing 1 is provided with suitable aligned apertures to permit projection and passage of each of the drawers, and the front walls 21 of the drawers are provided with handles 23 so that they may be opened in the usual manner. Each drawer is provided with a fragmentary bottom wall formed of four sheet metal pieces 24 fitted in the corners between the walls 20, 21 and 22, in the manner best shown in Figures 2 and 3. The members 24 serve to support a record disk within the drawer.

The space within the casing 7 between each two drawers serves as a reservoir for records, and means are provided for delivering records to the drawer one at a time in response to opening and closing movement thereof. In order to insure that the records within the storage space will clear the top edges of the side walls 20 of the drawer, the side walls 10 of the casing 7 are provided at each reservoir with a plate 25 having its lower edge deflected inwardly, as best shown in Figures 8 and 9. The rear wall 9 is provided with a similar plate 26, best shown in Figure 2. The front wall 11 of casing 7 of each reservoir is provided with an enlarged opening 27 for loading purposes. This opening is closed by a removable closure plate 28 which is arranged in the position best shown in Figure 2 and is held in that position by a button 29 on the plate, which is fitted within a bayonet slot 30 formed in the front wall 11 above the opening 27 in the manner best shown in Figures 2 and 7. The plate 28 may be made of less width than the opening 27 so that when the outer housing 1 is removed, the operator may remove any closure plate 28 in order to load the reservoir by grasping its side edges and disengaging the button 29 from the slot 30.

As best shown in Figures 3, 8 and 9, a plurality of records may be placed within the reservoir above each drawer and supported upon a sharp edged inwardly projecting blade 31 of a record feeding mechanism indicated generally at 32 and located between the casings 7 and 8, and also upon a corresponding sharp edged blade 33 adjacent wall 12 of casing 7, which also forms a part of the record feeding mechanism indicated generally at 34. It should be noted that the record feeding mechanism indicated at 32 is a double unit since it serves reservoirs in both of the casings 7 and 8, while the record feeding mechanism 34 serves only the reservoir in the casing 7.

As best shown in Figures 8, 9, and 11, the record feeding mechanism indicated generally at 32 comprises a housing having a bottom wall 35, a top wall 36, and side walls 37 and 38. These walls define a rectangular opening passing entirely through the housing from the interior of casing 7 to the interior of casing 8. The housing is fixed in any desired manner to the spaced walls of the casings 7 and 8 and projects through suitable openings formed in such walls in the manner best shown in Figures 8 and 9.

The bottom wall 35 of the housing is provided with a pair of transversely extending recesses in which are fitted a pair of slide bars 39 and 40, respectively. The bars 39 and 40 project through the side wall 37 of the housing, as best shown in Figure 3.

Slidably positioned within the opening in the housing, are a pair of flat blades 31 and 41 which are generally rectangular in form, and a pair of similarly shaped flat plates 42 and 43, as best shown in Figures 8, 9, and 10. The blade 31 and the plate 42 are adapted to control the feed of the records from the reservoir in casing 7 while the blade 41 and plate 43 perform the same function with respect to the records in the casing 8. As best shown in Figure 10, the blade 31 is provided with a diagonal slot 44 which receives a vertical pin 45 fixed to the slide bar 39. The blade 41 has a similar slot 46 which receives a vertical pin 47 fixed to the slide bar 40. As a result of this arrangement, reciprocation of the slide bars 39 and 40, respectively, effects reciprocation of the blades 31 and 41. It will be noted that the trailing edge of the blade 31 is recessed at 48 so that it will not contact pin 47. The blade 41 is similarly shaped and recessed so that it will not contact pin 45. Consequently, movement of one blade by its associated slide bar will not effect the position of the other blade.

As best shown in Figure 11, the plate 42 is provided with a diagonal slot 49 which receives a pin 45, while the plate 43 is provided with a similar slot 50 to receive pin 47. The trailing edge of the plate 42 is recessed at 51 so that it will not contact pin 47 and the trailing edge of the plate 43 is similarly recessed to avoid contact with the pin 45.

It will be noted that the angle of the slot 44 is oppositely disposed with respect to that of slot 49 and the same relation exists between the slots 46 and 50. Consequently, when the slide bar 39 is moved downwardly, as viewed in Figure 10, blade 31 will be retracted and plate 42 advanced, thus shifting the parts from the position shown in Figure 8 to that shown in Figure 9. Reverse movement of the slide bar 39 returns the blade 31 and plate 42 to the position of Figure 8. Reciprocation of the slide bar 40 has a similar effect on the blade 41 and the plate 43.

The arrangement of the parts is such that when the drawer is closed, it will contain a record indicated generally at 52 in Figure 8, while the remainder of the records in the reservoir will rest upon the blade 31. When the drawer is pulled outwardly, a dog 53 on the bar 39 is engaged by a shoulder 54 formed by the termination of a cutaway recess 55 in the adjacent side wall 20 of the drawer. While the form of the dog 53 in front elevation is not shown in the drawings, it is similar to that of the dog 56 associated with the slide bar 57 of the record dropping mechanism 34 located at the outer side of the casing 7, as best shown in Figure 12. Upon such engagement between the dog 53 and the shoulder 54 during the opening movement of the drawer 18, the slide bar 39 will be pulled forwardly thereby retracting the blade 31 and shifting the plate 42 from the position in Figure 8 to that of Figure 9. This allows the stack of records in the reservoir to drop onto the plate 42. When the drawer is closed, a shoulder 58 on the side wall 20 at the forward end of the recess 55 engages the dog 53 and returns the slide bar 39 and associated parts to the position shown in Figure 8. During such movement, the knife edged blade 31 enters between the bottom record in the stack and the record immediately above it, thereby separating the two, permitting the lowermost record to drop into the drawer and supporting the remainder of the records in the reservoir.

It will be observed that in order to accomplish the above functions, the top surface of the plate 42 and the edge of the blade 31 must be spaced by approximately the thickness of each record disk. This is accomplished by providing a thickened portion 59 on the bottom of blade 41. The blades 31 and 41 and the plates 42 and 43 are all of equal thickness except for the thickened portion 59 on blade 41. Consequently, the edge of blade 31 is spaced from the top surface of plate 42 by the thickness of blade 41 plus the thickened portion thereof, while the edge of blade 41 is spaced from the top surface of plate 43 by the thickness of plate 42 plus the thickened portion 59 on blade 41. This spaces the two sets of blade edges and plates by the proper distances.

It is found that different makes of phonograph record disks vary somewhat in thickness. Consequently, if the record disk feeding mechanism would not operate upon a range of thickness of records, its utility would be limited. In accordance with the present invention, this difference is overcome by placing each record disk in a relatively heavy manilla envelope indicated at 60. The side edges of the envelope can be creased to form a sharp knife edge 61. The space between the blade edges and the supporting plates is then made sufficient to accommodate records of maximum thickness plus the thickness of the envelope. The tapered edges of the envelope are of sufficient stiffness to permit the blade edges to elevate a record stack even though the lowermost record is of minimum thickness.

It will be understood that the record feeding mechanism indicated generally at 34 will be substantially identical in construction and mode of operation to that indicated at 32 except that it will comprise a single set of one blade and one supporting plate. Thus, as best shown in Figures 3, 12 and 13, the record feeding mechanism indicated at 34 includes a blade 33 and supporting plate 62. The blade and plate are provided, respectively, with angular slots 63 and 64 which co-operate with a pin 65 carried by the slide bar 57. The dog 56 on the slide bar 57 engages shoulders 66 and 67 (Figure 2) at the end of the recess 68 in the left-hand side wall 20 of the drawer simultaneously with the engagement of dog 53 with the corresponding shoulders 54 and 58. Consequently, the two record disk feeding mechanisms operate simultaneously to discharge records one at a time into the drawer upon closure thereof. It is understood that each drawer will be provided with a reservoir and record feeding mechanism.

The coin controlled latching and selecting mechanism will now be described. A pair of coin chutes 69 of any desired construction are fixed to the back wall 6 and extend vertically down the inside of the back wall behind the center of the casings 7 and 8, respectively. The upper end of each coin chute terminates in proximity to an opening 70 in the outer housing 1 through which a coin may be inserted. The coin chute is made in the form of a plurality of separate aligned sections, each of which extends from a point above one drawer to a point slightly below the same drawer, where it terminates in slightly spaced relation with respect to the upper end of the next section, as best shown in Figure 2. The arrangement is such that normally a coin deposited in one of the openings 70 will pass downwardly through the individual sections passing through the gaps between them without interruption until it reaches the lower end of the lowermost section, one of which is illustrated in Figure 2. The lower end of each bottom section is bent laterally inwardly along the rear wall and is then curved on edge forwardly to the front wall of the housing 1, as best shown in Figure 3. The two chutes can be joined together so that they lead to a common coin return pocket 71 mounted on the front wall 2 of the housing 1.

Means are provided for selectively deflecting a coin from the coin chute at any one of the vertically spaced drawers in such a manner that the coin will release a drawer latching device. This means is operated by opening the selected drawer to the limited extent permitted by the latch before it releases. Thus, there is provided adjacent the upper end of each vertical section of the coin chute 69, a coin deflector 72, which is similar in construction to the coin chute itself but is pivoted on a pin 73 carried by a pair of ears 74 formed on the coin chute section adjacent its upper end. The coin deflector 72 is provided with an upwardly projecting tongue 75 which is adapted to swing against the back wall 6 of the housing immediately above the upper extremity of the coin chute section on which it is mounted, in the manner shown in Figure 4. A small leaf spring 76 is secured to the back side of the coin deflector and extends over the pin 73 to assist coins in passing the deflector when it is in the position illustrated in Figure 2.

A strip of metal in the form of a generally U-shaped bracket 77 is secured to the forward face of the rear wall 19 of the drawer in such a manner as to provide on the rear wall a more or less circular pocket which is of approximately the diameter of the coin which will effect operation of the machine. A metal stamping 78 fastened to the rear wall 6 of the machine forms a flat platform or floor underlying the coin pocket. The floor is slotted at 79 to receive a pivoted latch 80 carried by a pin 81 which is supported by a bracket 82 fastened to the underside of the stamping 78. The left-hand end of the pivoted latch 80, as viewed in Figure 2, is of greater weight than the right-hand end with the result that it normally swings by gravity into the position illustrated in Figure 2 in which the upper right-hand end of the latch projects above the top surface of stamping 78 in position to engage the rear wall 19 of the drawer and thereby limit opening movement of the drawer. The arrangement is such, however, that when the latch is in the position illustrated, it permits a slight opening movement represented by the distance between the right-hand end of the latch 80 and the inside face of the rear wall 19 of the drawer. Consequently, the drawer may be opened at any time to the extent permitted by the latch and such opening movement is relied upon to effect operation of the coin deflector 72.

The coin deflector is operated by a leaf spring 83, which is fixed to a tab 84 formed on the strap 77. The free right-hand end of the leaf spring 83, as best shown in Figure 4, is bent upwardly at an acute angle to horizontal and thence downwardly at a similar angle to form a spring detent adapted to co-operate with an arm 85 formed on the small plate 86 secured to the underside of the lower end of the coin deflector 72. The upper edge of the plate 86 is bent rearwardly at 87 to form a limit stop engageable with the coin chute to prevent counterclockwise rotation of the coin deflector 72 beyond the point illustrated in Figure 2. The arrangement is such that when the drawer is pulled outwardly to the extent permitted by the latch 80, the detent projection on the leaf spring 83 will, by engagement with the arm 85 of plate 86, swing the coin deflector in a clockwise direction into the position illustrated in Figure 4, thereby deflecting any coin which is deposited in the chute into the pocket defined by the strap 77. Since the pocket is of approximately the same diameter as a coin, the coin will then rest upon the upper end of the latching lever 80 and tend to force it downwardly into release position. Such release movement of the latch will occur as soon as the drawer is moved forward slightly to relieve the frictional engagement between the wall 19 and the end of the latch lever.

Figure 5:
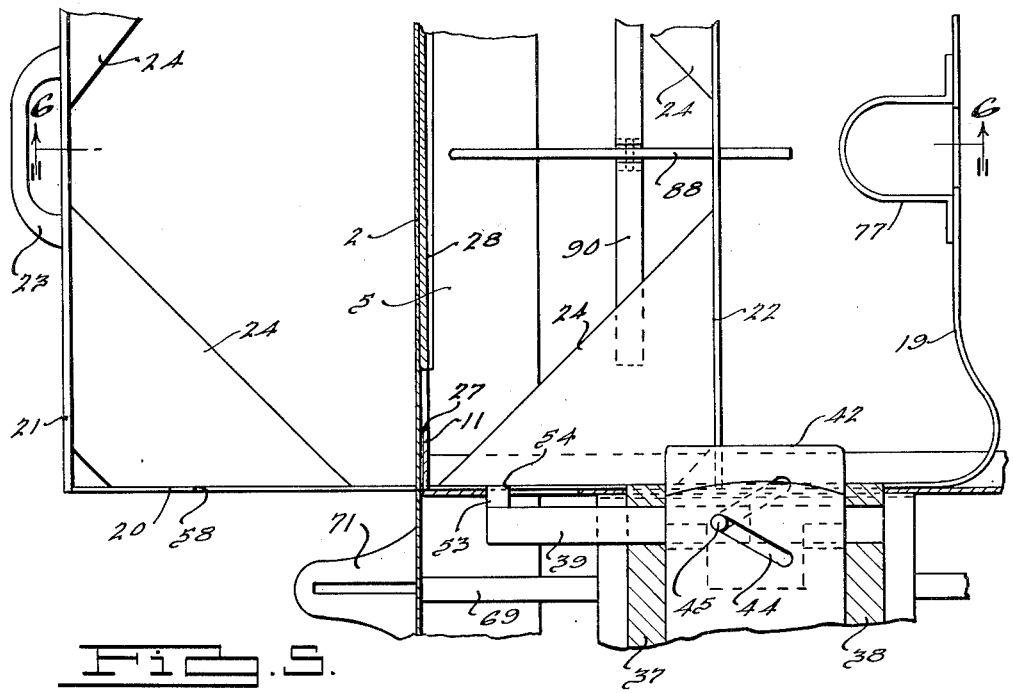
Figure 5 is a fragmentary horizontal section similar to Figure 3 showing the parts in record discharge position.
Figure 6:
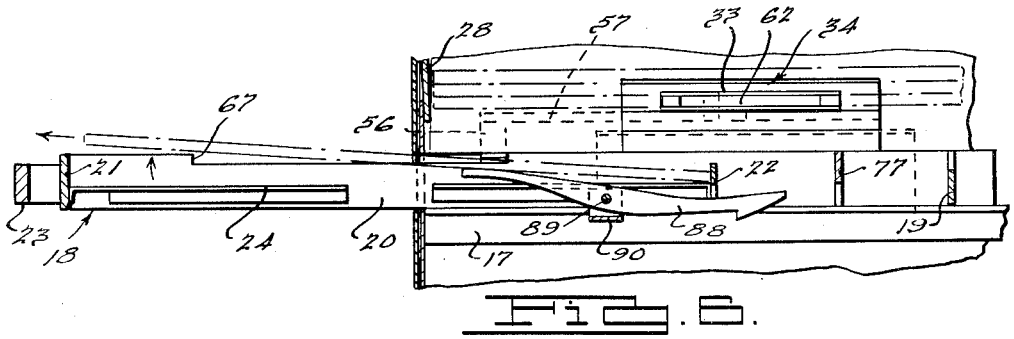
Figure 6 is a section taken on the line 6—6 of Figure 5.

The releasing movement of the latch 80 will then be effected by the weight of the coin. Thereafter, the drawer may be pulled into a full open position, such as illustrated in Figures 5 and 6. During such opening movement, the coin will be slid over the top surface of the stamping 78 and dropped over the forward edge thereof into any suitable form of coin receiving device, not shown.

The detent projection on the leaf spring 83 will be forced out of engagement with the arm 85 during such opening of the drawer and when the drawer is subsequently closed, the detent will again pass the arm due to the fact that counter-clockwise rotation of the coin deflector 72 is limited by the projection 87. The coin deflector is so constructed that its weight normally tends to swing it into the position shown in Figure 2. This permits passage of a coin past the deflector and into the next lower section of the coin chute.

Means are provided for preventing all opening movement of each drawer as long as it is empty, in order to prevent deflection of the coin by limited opening movement of a drawer which contains no record disk. This means comprises a latch 88 pivoted on a pin 89 carried by a strap 90 which extends between the two rearmost plates 24 in the drawer section, as best shown in Figures 2 and 3. The strap 90 is fastened to the underside of the plates 24 and its central portion is bent downwardly at 91 in a U-shaped form to embrace the latch 88. The lower portion of the U-shaped section 91 lies immediately beneath the latch 88 and serves to prevent clockwise swinging movement of the latch beyond the position illustrated in Figure 2 when the drawer is open. The right-hand extremity of the latch is provided with a hooked portion 92 which is adapted to engage over the edge of the drawer opening in the rear wall 9 of the casing 7 when the latch is in the position illustrated in Figure 2, to prevent all opening movement of the drawer. The left-hand extremity of the latch 88 extends into a position approaching the center of the record receiving space within the drawer, and is adapted to engage the underside of a record positioned in the drawer. As long as there is a record in the drawer, the weight of the record will depress the left-hand end of the latch 88, thereby raising the hook-shaped section 92 above the lower edge of the opening in wall 9 so that the drawer can be opened. The right-hand end of the latch, being slightly heavier than the left-hand end, will swing downwardly into the latching position illustrated in Figure 2 when the drawer is empty.

After the drawer has been opened and a record removed, the hooked end of the latch will swing downwardly. However, the rearward extremity of the latch is provided with a sloping surface 93 which will engage the lower edge of the drawer opening in the wall 9 during the closing movement of the drawer and thereby cause the latch to be cammed upwardly past the wall 9.

Figure 14:
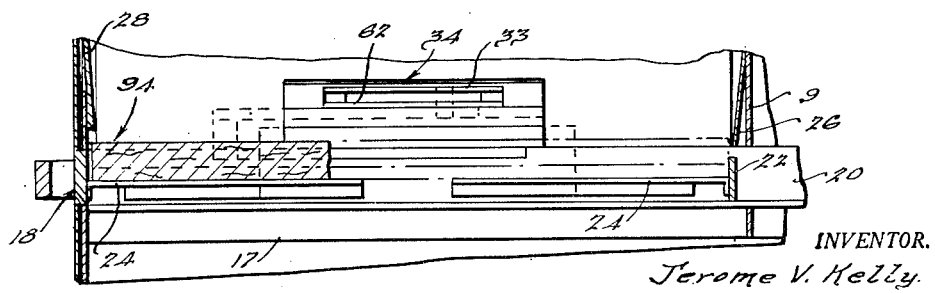
Figure 14 is a fragmentary section similar to Figure 2 but of an alternative means for preventing operation of the selecting mechanism when all of the records associated therewith are exhausted.

An alternative means to prevent opening movement of the drawer when all of the records are exhausted is shown in Figure 14. As there shown, a dummy record, indicated generally at 94, is placed in the record reservoir on top of the uppermost record therein. The dummy record is, however, of greater thickness than the distance from the top surface of the supporting plates 24 to the top edge of the drawer, with the result that when the dummy record is in the drawer, the drawer cannot be opened. It will be understood, of course, that the side edges of the dummy record will be reduced in thickness to correspond to the spacing between the knife edge on the blade 31 and the top surface of the plate 42 of the record feeding mechanism so that the dummy will be deposited in the drawer after the last record has been dispensed. With this arrangement, the latch 88 may be omitted. However, the use of the latch is preferred since the dummy occupies considerable space and thereby reduces the capacity of the machine.

It will be apparent there is provided, in accordance with the present invention, an exceedingly simple and practical phonograph record dispensing device. An important feature of the machine resides in the fact that a very large percentage of the total space within the cabinet may be filled solidly with phonograph records and, consequently, the machine has a large capacity for a given size. While, in the particular form of machine illustrated, two vertical rows of drawers and reservoirs are provided, each having six drawers, it will be apparent that any desired number of vertical rows may be incorporated in the machine and that the vertical rows of drawers may be of any desired height.

The particular machine illustrated is designed for operation by a single coin and it will be understood that the usual slug detector mechanism may be associated with the coin slot above the uppermost deflector, if desired. While the machine is referred to herein as a "coin controlled machine," it will be appreciated that it may be designed for operation by a specially constructed slug or token and, accordingly, it is to be understood that the term "coin" as used herein and in the appended claims includes not only actual coins but such specially designed slugs or tokens.

While only one form of the invention is illustrated and described herein, it will be apparent that variations in the design and arrangement of the parts may be indulged in without departing from the spirit of the invention and the scope of the appended claims.

What is claimed is:

1. A coin controlled phonograph disk record vending machine including a cabinet having a plurality of sliding drawers, each adapted to receive a record disk, means for locking said drawers, coin controlled means for selectively unlocking any drawer to permit opening thereof and removal of a record, means associated with each drawer for supporting a supply of records, and means operated in response to a movement of any drawer for depositing a record therein from said record supporting means.

2. A coin controlled phonograph disk record vending machine including a cabinet having a plurality of sliding drawers, each adapted to receive a record disk, means for locking said drawers, coin controlled means for selectively unlocking any drawer to permit opening thereof and removal of a record, means for supporting a stack of records above each drawer and within the cabinet, said means being effective when actuated to drop one record at a time off the bottom of the stack and into the drawer, and means to actuate said last mentioned means in response to movement of said drawer.

3. A coin controlled phonograph disk record vending machine including a cabinet having a plurality of separate record disk supporting magazines therein, a plurality of movable record disk ejecting elements associated respectively with said magazines, individual latch means normally limiting movement of each element to such an extent that it does not eject a record disk, each of said latch means being releasable on operative engagement with a coin, a coin chute, and means operable on movement of any one element to the extent normally permitted by said latch means for diverting a coin from said chute into operative engagement with the latch means associated with said one element.

4. A coin controlled phonograph disk record vending machine including a cabinet having a plurality of sliding drawers, each adapted to receive a record disk, an individual latch for each drawer for normally limiting opening movement thereof to such an extent that the record therein cannot be removed, coin operated release means for each latch, a coin chute, and means operated upon an opening of any one drawer to the extent normally permitted by said latch for diverting a coin from said chute to the release means associated with said drawer.

5. A coin controlled phonograph disk record vending machine including a cabinet having a plurality of sliding drawers, each adapted to receive a record disk, an individual latch for each drawer for normally limiting opening movement thereof to such an extent that the record therein cannot be removed, each latch being releasable upon operative engagement with a coin, a coin chute, and means operable upon an opening of any one drawer to the extent normally permitted by said latch for diverting a coin from said chute into operative engagement with the latch associated with said drawer.

6. A coin controlled phonograph disk record vending machine including a cabinet having a plurality of sliding drawers, each adapted to receive a record disk, means for locking said drawers, coin controlled means for selectively unlocking any drawer to permit opening thereof and removal of a record, means for supporting a stack of records above each drawer and within the cabinet, said means being effective when actuated to drop one record at a time off the bottom of the stack and into the drawer, means to actuate said last mentioned means in response to a movement of said drawer, and means to prevent opening of any drawer which contains no record disk.

7. A coin controlled phonograph disk record vending machine including a cabinet having a plurality of separate record disk supporting magazines therein, a plurality of movable record disk ejecting elements associated respectively with said magazines, individual latch means normally preventing ejecting movement of each element, each of said latch means being releasable on operative engagement with a coin, a coin chute, selectively operable means for diverting a coin from said chute into operative engagement with any one of said latch means, separate means for each magazine normally operative to prevent operation of the coin diverting means associated with the magazine, and means operable in response to the presence of a record disk in each magazine for rendering inoperative the means which normally prevents operation of the coin diverting means associated with such magazine.

8. A coin controlled phonograph disk record vending machine including a cabinet having a plurality of separate record disk supporting magazines therein, a plurality of movable record disk ejecting elements associated respectively with said magazines, individual latch means normally limiting movement of each element to such an extent that it does not eject a record disk, each of said latch means being releasable on operative engagement with a coin, a coin chute, means operable on movement of any one element to the extent normally permitted by said latch means for diverting a coin from said chute into operative engagement with the latch means associated with said one element, means to prevent said coin diverting movement of any drawer which contains no record disk, and a coin return at the end of said chute.

9. A coin controlled phonograph disk record vending machine including a cabinet having a plurality of sliding drawers, each adapted to receive a record disk, an individual latch for each drawer for normally limiting opening movement thereof to such an extent that the record therein cannot be removed, a coin operated release means for each latch, a coin chute, means operated upon an opening of any one drawer to the extent normally permitted by said latch for diverting a coin from said chute to the release means associated with said drawer, means to prevent said coin diverting movement of any drawer which contains no record disk, and a coin return at the end of said chute.

10. A coin controlled phonograph disk record vending machine including a cabinet having a plurality of sliding drawers, each adapted to receive a record disk, an individual latch for each drawer for normally limiting opening movement thereof to such an extent that the record therein cannot be removed, each latch being releasable upon operative engagement with a coin, a coin chute, and means operable upon an opening of any one drawer to the extent normally permitted by said latch for diverting a coin from said chute into operative engagement with the latch associated with said drawer, means to prevent said coin diverting movement of any drawer which contains no record disk, and a coin return at the end of said chute.

11. In a coin controlled phonograph disk record vending machine, a cabinet, a sliding drawer in the cabinet adapted to contain a record disk, means for supporting a vertical stack of records in the cabinet and above the drawer, said means including a pair of horizontally movable plates movable toward and from each other and adapted when moved toward each other to support the stack of records, a pair of horizontally movable blades mounted above said plates respectively and adapted when moved toward each other to enter between the bottom two records and support all of the records except the bottom record, and means operable to move the blades toward each other and the plates away from each other when the drawer is moved in one direction and to move the blades away from each other and the plates toward each other when the drawer is moved in the other direction, said last mentioned means including a lost motion connection between the drawer and the plates and blades.

12. In a coin controlled phonograph disk record vending machine, a cabinet, a sliding drawer in the cabinet adapted to contain a record disk, means for supporting a vertical stack of records in the cabinet and above the drawer, said means including a pair of horizontally movable plates movable toward and from each other and adapted when moved toward each other to support the stack of records, a pair of horizontally movable blades mounted above said plates respectively and adapted when moved toward each other to enter between the bottom two records and support all of the records except the bottom record, and means operable to move the blades toward each other and the plates away from each other when the drawer is shut and to move the blades away from each other and the plates toward each other when the drawer is opened, said last mentioned means including a lost motion between the drawer and the plates and blades.

JEROME V. KELLY.

REFERENCES CITED

The following references are of record in the file of this patent:

UNITED STATES PATENTS

| Number | Name | Date |
|---|---|---|
| 744,673 | Balsley | Nov. 17, 1903 |
| 875,128 | Spaulding | Dec. 31, 1907 |
| 1,241,093 | Collins | Sept. 25, 1917 |
| 1,603,197 | Cutler | Oct. 12, 1926 |
| 1,719,826 | Aldrich | July 9, 1929 |
| 1,869,070 | McLaren | July 26, 1932 |
| 1,938,843 | Leve | Dec. 12, 1933 |
| 2,094,433 | Sharp | Sept. 28, 1937 |
| 2,398,543 | Lo Cascio et al | Apr. 16, 1946 |

FOREIGN PATENTS

| Number | Country | Date |
|---|---|---|
| 419,669 | Great Britain | Nov. 12, 1934 |
| 577,860 | France | June 14, 1924 |